(12) United States Patent
Kalliola et al.

(10) Patent No.: US 7,978,137 B2
(45) Date of Patent: *Jul. 12, 2011

(54) PERFORMANCE AND POWER MANAGEMENT IN DIRECTION OF ARRIVAL DETERMINATION BY UTILIZING SENSOR INFORMATION

(75) Inventors: Kimmo Kalliola, Helsinki (FI); Hannu Kauppinen, Helsinki (FI); Joni Jantunen, Finnish (FI); Antti Kainulainen, Espoo (FI); Vuokko Nurmela, Espoo (FI)

(73) Assignee: Nokia Corporation, Espoo (FI)

( * ) Notice: Subject to any disclaimer, the term of this patent is extended or adjusted under 35 U.S.C. 154(b) by 553 days.

This patent is subject to a terminal disclaimer.

(21) Appl. No.: 12/029,290

(22) Filed: Feb. 11, 2008

(65) Prior Publication Data

US 2008/0150804 A1 Jun. 26, 2008

Related U.S. Application Data

(63) Continuation of application No. 11/532,426, filed on Sep. 15, 2006, now Pat. No. 7,548,203.

(51) Int. Cl.
G01S 3/52 (2006.01)
G01S 5/04 (2006.01)
(52) U.S. Cl. ........................................ 342/418; 342/442
(58) Field of Classification Search .................. 342/418, 342/437, 442, 443, 444
See application file for complete search history.

(56) References Cited

U.S. PATENT DOCUMENTS

| 5,515,061 | A | 5/1996 | Hiltz et al. |
| 5,706,110 | A | 1/1998 | Nykanen |
| 6,075,442 | A | 6/2000 | Welch |
| 6,278,406 | B1 | 8/2001 | Kuwahara |
| 6,778,902 | B2 | 8/2004 | Hathiram et al. |
| 6,807,159 | B1 | 10/2004 | Shorey et al. |
| 6,944,457 | B2 | 9/2005 | Alinikula et al. |
| 6,970,726 | B2 | 11/2005 | Takayanagi |
| 6,993,357 | B1 | 1/2006 | Ito et al. |
| 7,201,054 | B2 | 4/2007 | Workman |
| 7,298,314 | B2 | 11/2007 | Schantz et al. |
| 7,548,203 | B2 * | 6/2009 | Kalliola et al. ............. 342/418 |
| 2003/0060206 | A1 | 3/2003 | Sointula et al. |
| 2003/0083095 | A1 | 5/2003 | Liang |

(Continued)

FOREIGN PATENT DOCUMENTS

EP 1473951 A2 11/2003

(Continued)

OTHER PUBLICATIONS

Honkanen et al., Low End Extension for Bluetooth, IEEE Radio & Wireless Conference RAWCON 2004, Sep. 19-22, 2004.

(Continued)

*Primary Examiner* — Dao L Phan
(74) *Attorney, Agent, or Firm* — Locke Lord Bissell & Liddell, LLP

(57) ABSTRACT

A system for enhancing the performance of a wireless communication device (WCD) while executing a direction of arrival (DoA) estimation. The performance may be improved through device management, and may include the collection of information from one or more sensors installed within the WCD. The sensor information may initially be used to determine an appropriate configuration for the device. Further, the sensor information may also be used to affect the behavior of the device while performing the DoA estimation.

27 Claims, 15 Drawing Sheets

U.S. PATENT DOCUMENTS

| | | |
|---|---|---|
| 2003/0148760 A1 | 8/2003 | Takayanagi |
| 2004/0002305 A1 | 1/2004 | Byman-Kivivuori et al. |
| 2004/0038645 A1 | 2/2004 | Reunamaki et al. |
| 2004/0214527 A1 | 10/2004 | Lim et al. |
| 2004/0239562 A1 | 12/2004 | Schantz |
| 2004/0259542 A1 | 12/2004 | Viitamaki et al. |
| 2004/0266494 A1 | 12/2004 | Ruuska et al. |
| 2005/0014468 A1 | 1/2005 | Salokannel et al. |
| 2005/0020322 A1 | 1/2005 | Ruuska et al. |
| 2005/0020325 A1 | 1/2005 | Enger et al. |
| 2005/0046608 A1 | 3/2005 | Schantz |
| 2005/0059420 A1 | 3/2005 | Salokannel et al. |
| 2005/0075123 A1 | 4/2005 | Jin et al. |
| 2005/0164633 A1 | 7/2005 | Linjama et al. |
| 2005/0221758 A1 | 10/2005 | Busse |
| 2005/0266798 A1 | 12/2005 | Moloney et al. |
| 2005/0282588 A1 | 12/2005 | Linjama et al. |
| 2006/0007890 A1* | 1/2006 | Yokoyama .................... 370/334 |
| 2006/0068750 A1 | 3/2006 | Burr |
| 2006/0081050 A1 | 4/2006 | Workman |
| 2006/0116178 A1 | 6/2006 | Vuong et al. |
| 2006/0128305 A1 | 6/2006 | Delalat |
| 2006/0158341 A1 | 7/2006 | Chipchase et al. |
| 2006/0165060 A1 | 7/2006 | Dua |
| 2006/0172701 A1 | 8/2006 | Kienhoefer |
| 2007/0099679 A1 | 5/2007 | Saarisalo |

FOREIGN PATENT DOCUMENTS

| | | |
|---|---|---|
| EP | 1583295 A2 | 5/2005 |
| GB | 2399475 A | 9/2004 |
| GB | 2412817 A | 5/2005 |
| WO | 03100452 A1 | 12/2003 |

OTHER PUBLICATIONS

LAN/MAN Standards Committee of the IEEE Computer Society, IEEE Standard 802.15.4: Wireless Medium Access Control (MAC) and Physical Layer (PHY) Specifications for Low-Rate Wireless Personal Area Network (LR-WPANs), The Institute of Electrical and Electronics Engineers, Inc., Oct. 1, 2003.

PCT International Search Report, Apr. 3, 2007, 11 pages.

European Patent Office Extended Search Report for Application No. 07012919.2-1248/1901086 dated Sep. 30, 2010.

* cited by examiner

FIG. 7
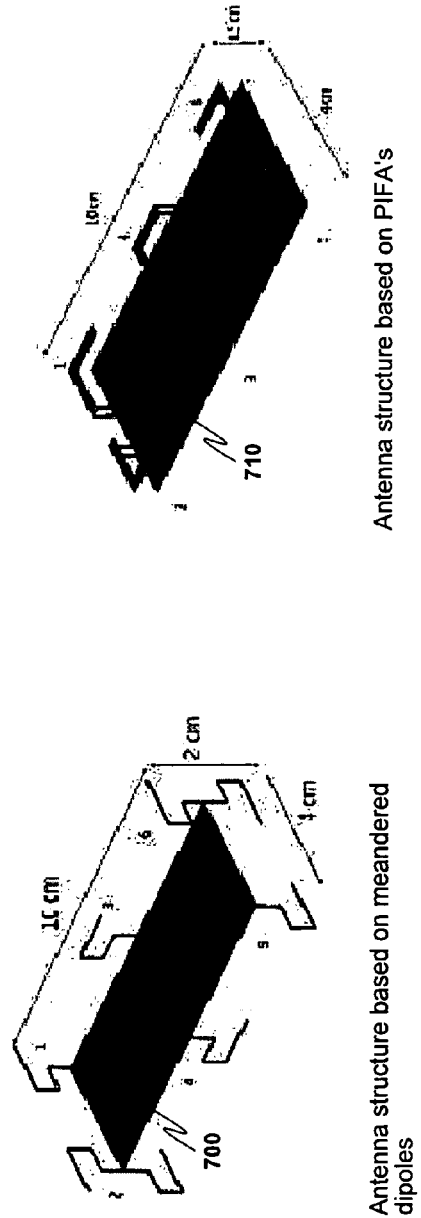
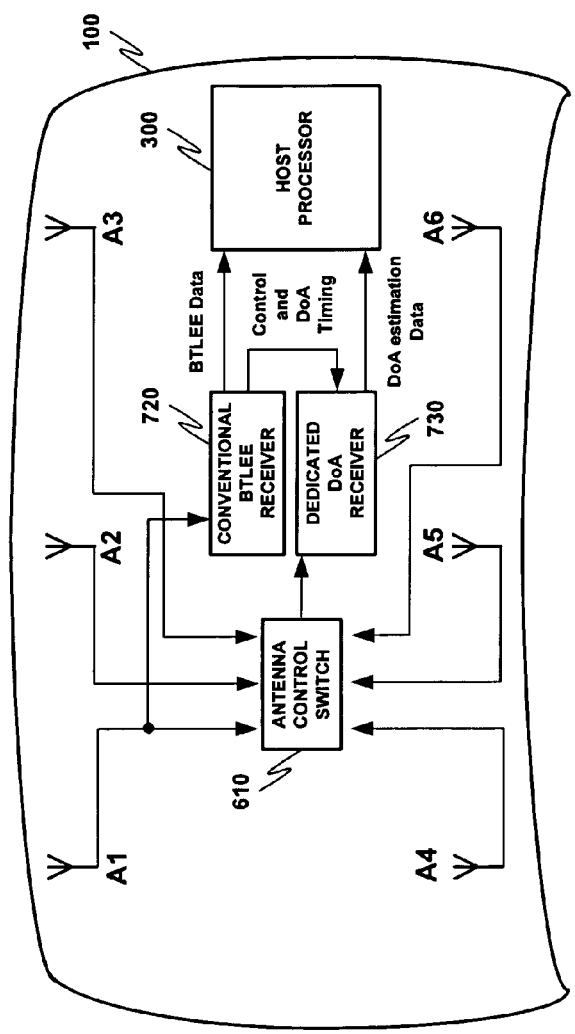
Antenna structure based on PIFA's
Antenna structure based on meandered dipoles

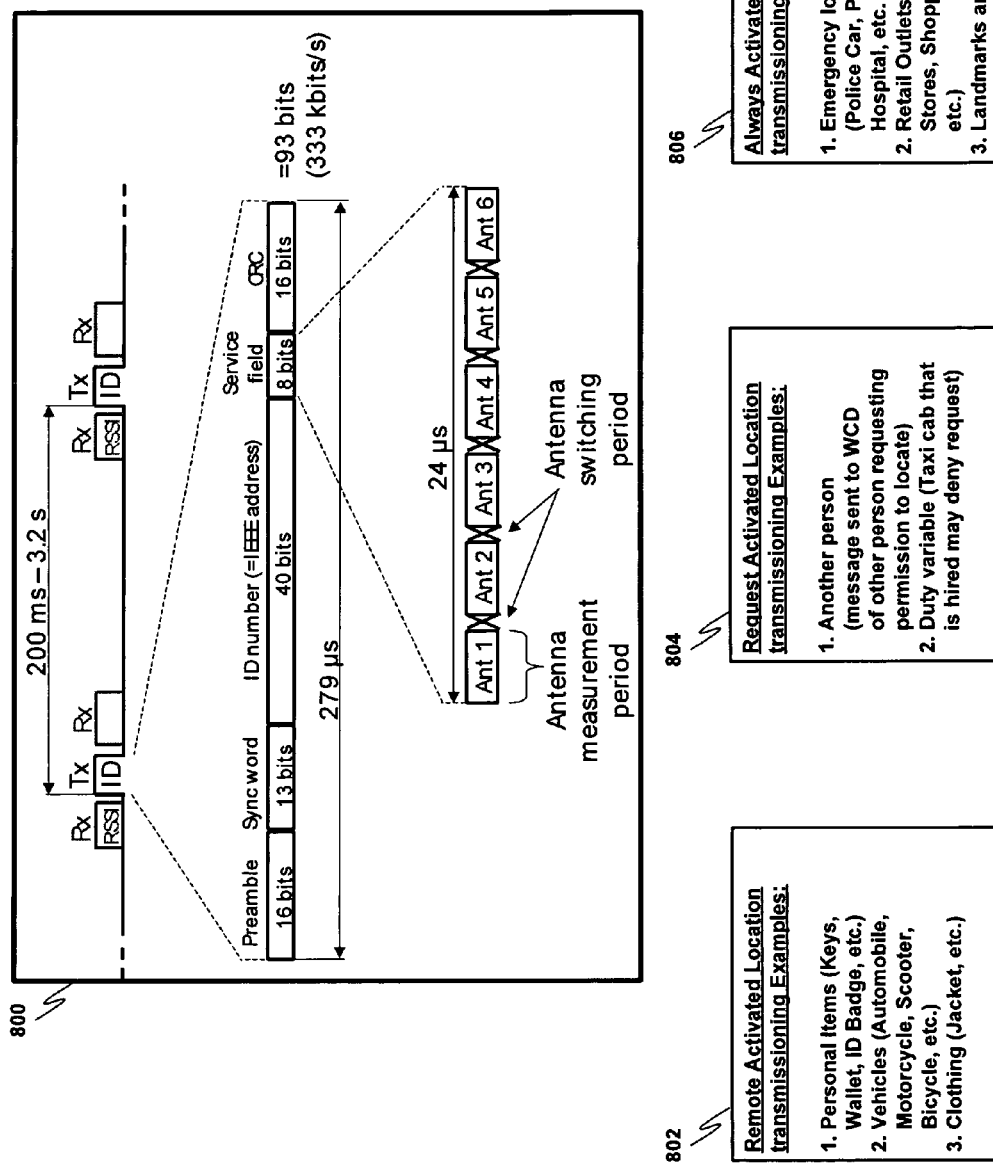

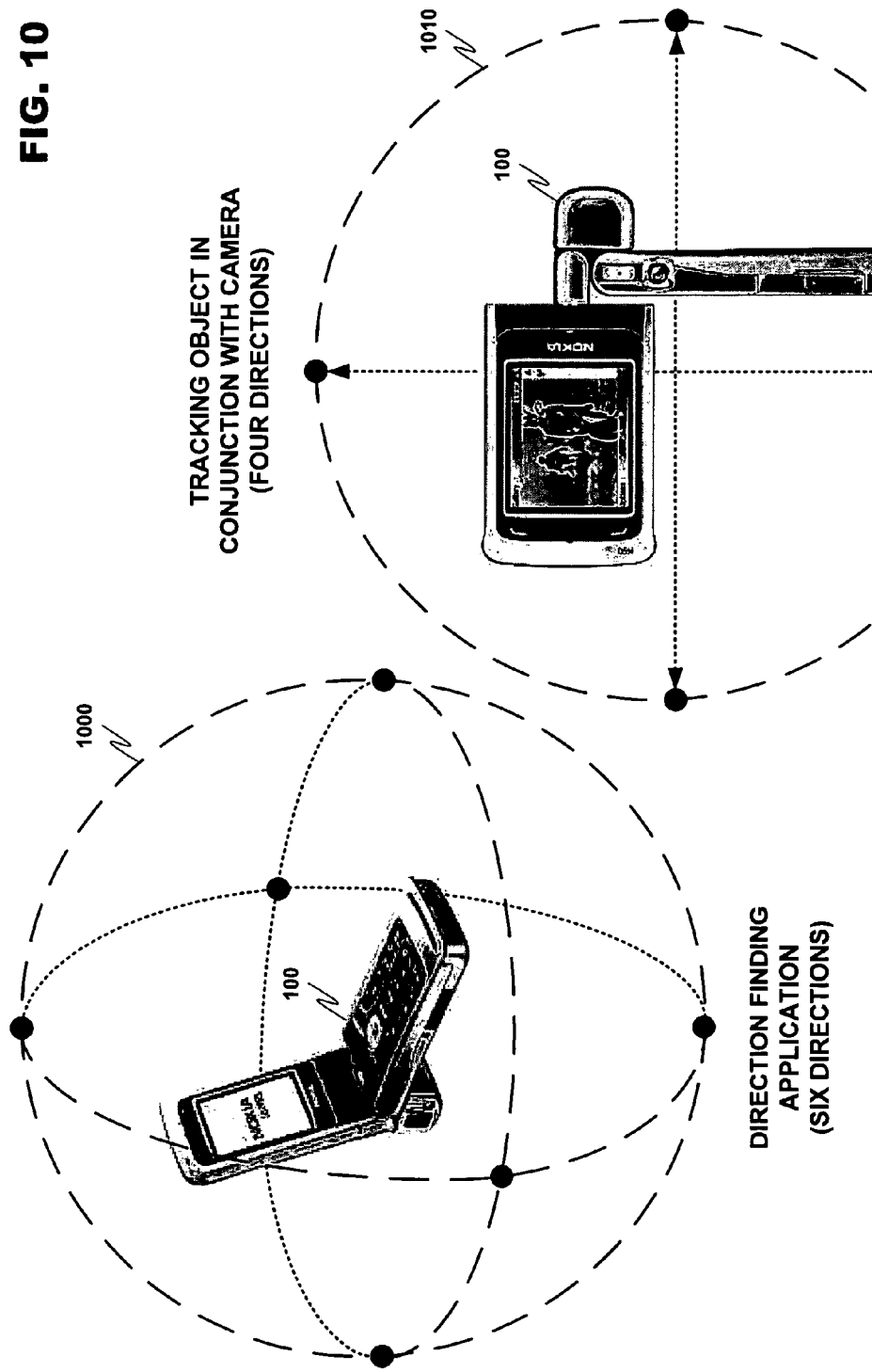

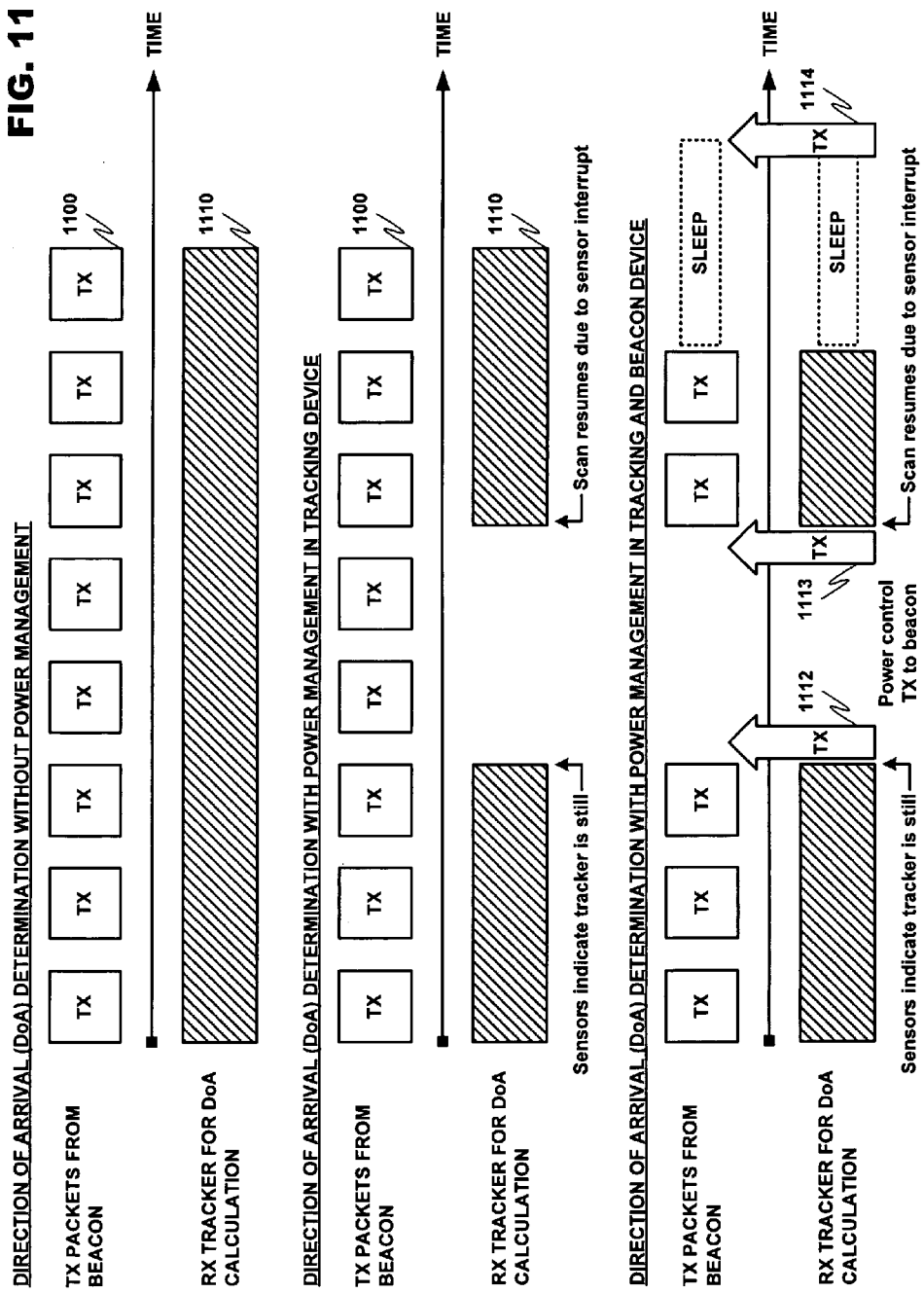

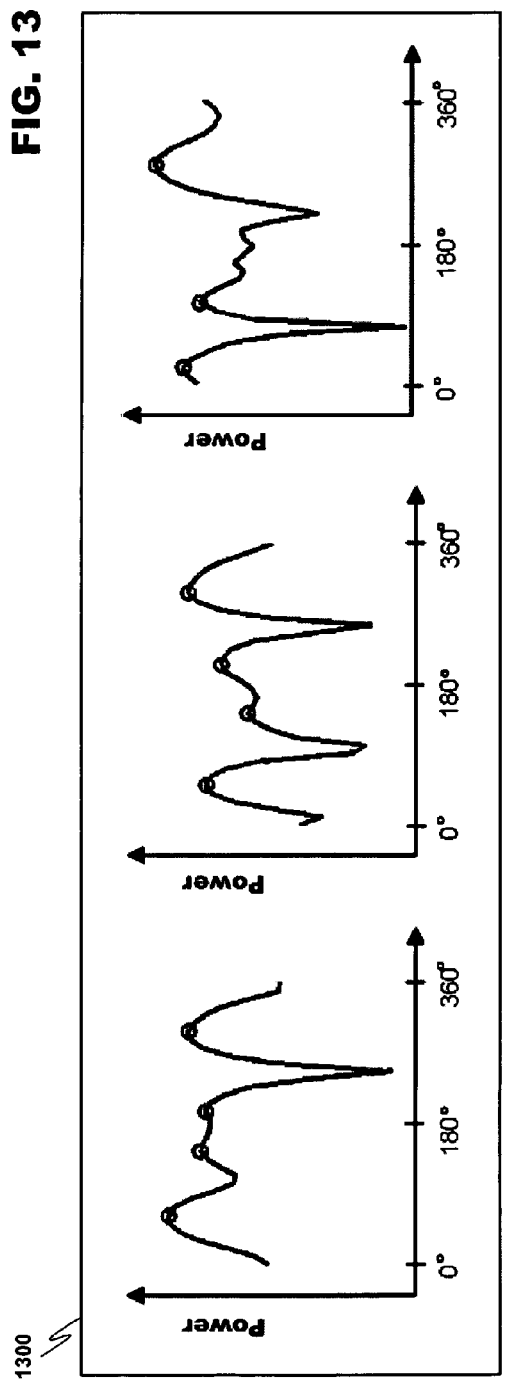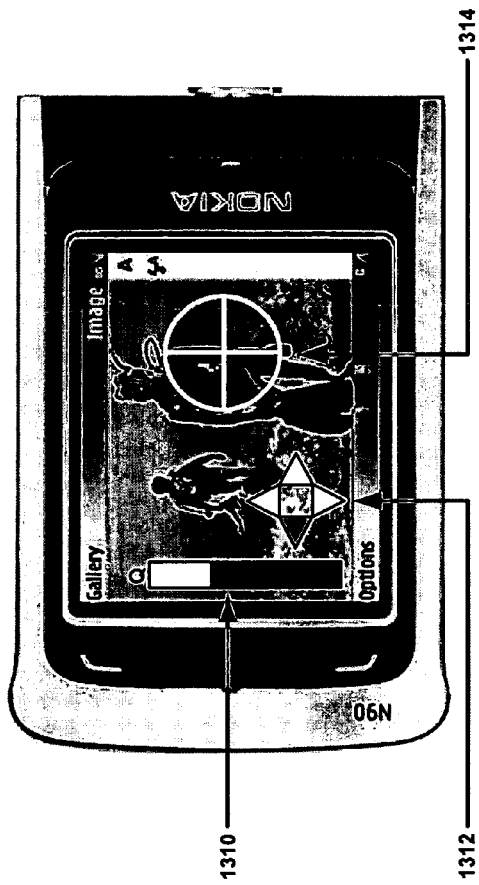
FIG. 13

PERFORMANCE AND POWER MANAGEMENT IN DIRECTION OF ARRIVAL DETERMINATION BY UTILIZING SENSOR INFORMATION

This application is a continuation of co-pending U.S. application Ser. No. 11/532,426, filed Sep. 15, 2006, entitled "PERFORMANCE AND POWER MANAGEMENT IN DIRECTION OF ARRIVAL DETERMINATION BY UTILIZING SENSOR INFORMATION", to which priority is claimed, and which is incorporated herein by reference in its entirety.

BACKGROUND OF INVENTION

1. Field of Invention

The present invention relates to a system for wireless direction-finding and location, and more specifically, to a system for improving the overall performance and power management in a wireless communication device performing a direction of arrival estimation.

2. Description of Prior Art

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHz-1.8 GHz band in Europe and at 1.9 GHz in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A Bluetooth™ enabled WCD transmits and receives data at a rate of 720 Kbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, Bluetooth Low End Extension (BTLEE)/BluLite, ZigBee/IEEE 802.15.4, and UHF RFID. All of these wireless mediums have features and advantages that make them appropriate for various applications.

More recently, manufacturers have also began to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

Wireless communication devices employing the previously discussed characteristics may be used for a variety of applications other than basic voice communications. Exemplary applications for business may include scheduling, word processing, spreadsheets, facsimile transmission, contact management, etc. There is also a multitude of applications for the personal enjoyment of the user, such as games, instant messaging, display wallpaper, etc.

A wireless service provider may determine the current location of a wireless communication device by how it is communicating on the wireless network (e.g., by identifying the cell where a cellular phone last accessed the network). While the benefit of being able to locate a communication device in certain situations is apparent, such as in an emergency, the ability to provide location-related information to a user would also be a beneficial feature. Exemplary systems now envisioned might empower a user to determine current location using their WCD, and combined with other applications, may be useful for route or direction finding from a current location to another mapped location.

Current handheld location-finding systems that operate using services such as the Global Positioning System (GPS) are now available on the market. These standalone devices may provide bearings and directions to address locations or longitude/latitude positions. However, the bearings and directions may only be provided relative to the moving direction of the GPS device. Traditional GPS receivers will not assist a user who wishes to track an object tagged with a beacon (for example, an IR beacon on a keychain fob), or a destination that is currently unknown, such as access to public transportation or a hospital marked by an IR beacon. While solutions are now being devised that provide for these tracking features in a wireless communication device, just making the functionality available does not fully satisfy the need. A portable device, such as a phone or communication-enabled PDA, may be resource constrained (e.g., by a battery power source and small size). Conversely, a WCD that is constantly searching for a signal may consume considerable power, especially if, given the shrinking size of today's devices, there is little room for a substantial antenna array to receive locator signals. As a result, for a tracking application to be useful and effective, these device limitations must be considered.

What is therefore needed is a directional and/or location finding method and system that allows a user to track or locate a signal beacon using a direction of Arrival (DoA) estimation, while simultaneously managing the wireless communication device to optimize its performance. The DoA application should work in conjunction with various resources within the wireless communication device in order to provide a visual representation of the relative direction towards, or location of, an object, place, etc. maintaining a broadcast beacon. The functionality should further utilize information from one or more sensors within the device to affect the behavior of the device, for example, by controlling the DoA functionality and/or application, quality measurement of the DoA estimate, power management of the device, etc.

SUMMARY OF INVENTION

The present invention includes at least a method, device and computer program for enhancing the performance of a WCD executing a direction of arrival (DoA) estimation. Performance may be improved through device management, and may include the collection of information from one or more sensors installed within the WCD. The sensor information may initially be used to determine an appropriate configuration for the device. Further, the sensor information may also be used to affect the behavior of the device during the DoA estimation.

The DoA estimation may, in at least one embodiment of the invention, involve determining a relative direction towards a beacon device emitting a locator signal. The relative direction towards the beacon may be displayed for a user on a display within the WCD. The DoA estimation may operate in a multitude of modes depending on the physical orientation of the device. For example, a closed device with an external display screen may execute a DoA application that displays a directional pointer in a compass-like fashion in order to indicate the direction towards a target. In another scenario, a different device orientation may activate other resources within the WCD, such as a camera. A camera image may be displayed on the WCD in a view-finder mode, including directional indicators and a target indicia for expressing to a user the direction to move the WCD in order to align the target with the target indicia. Information obtained from the one or more sensors may be used to indicate a configuration for an application, such as the application itself, antenna calibration vectors and a user interface configuration.

In addition, the WCD, in at least one embodiment of the present invention, may continue to use collected sensor information during the execution of a DoA estimation in order to enhance the performance of the WCD. For example, power management may be implemented through motion sensors installed in the WCD. A DoA-based application tracking a stationary target may conserve power by pausing a DoA estimation until the motion of the WCD is detected by the motion sensors. When the WCD is moved, the updating of the DoA estimation may be resumed. This functionality may be further implemented so that a power saving mode is triggered in both the tracking WCD and in the beacon device of a target. As a result, power may be conserved in the beacon device when the WCD is not actively performing a DoA estimation.

In a further example of the present invention, a quality level of the locator signal may be computed and indicated on the display of a WCD during a DoA estimation. A quality level may be determined by measuring an Azimuthal Power Spectrum (APS) for a beacon signal. A lack of a clearly dominant DoA (e.g., the locator signal appears to be arriving from several directions, or the dominant DoA varies faster than expected based on information provided by movement sensors in the WCD) may be an indication of an erroneous DoA estimate. In a situation where the reliability of the DoA estimate seems low, action(s) may be triggered within the WCD in order to prevent the user from wasting time and resources in following a false signal. For example, a DoA estimate may not be displayed for a received signal if the quality level is determined to be below a threshold level.

DESCRIPTION OF DRAWINGS

The invention will be further understood from the following detailed description of a preferred embodiment, taken in conjunction with appended drawings, in which:

FIG. 7 discloses exemplary antenna arrangements and an alternative structural description for receiving a position-indicating transmission in accordance with at least one embodiment of the present invention.

FIG. 8 discloses an exemplary position-indicating transmission and different transmission strategies in accordance with at least one embodiment of the present invention.

FIG. 10 discloses examples of coordinate systems that may be utilized in at least two applications of direction of arrival estimation in accordance with at least one embodiment of the present invention.

FIG. 11 discloses exemplary power management schemes for a tracking device and/or a beacon device in accordance with at least one embodiment of the present invention.

FIG. 13 discloses exemplary Azimuthal Power Spectrum diagrams and a signal quality indicator in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks

Figure 1:
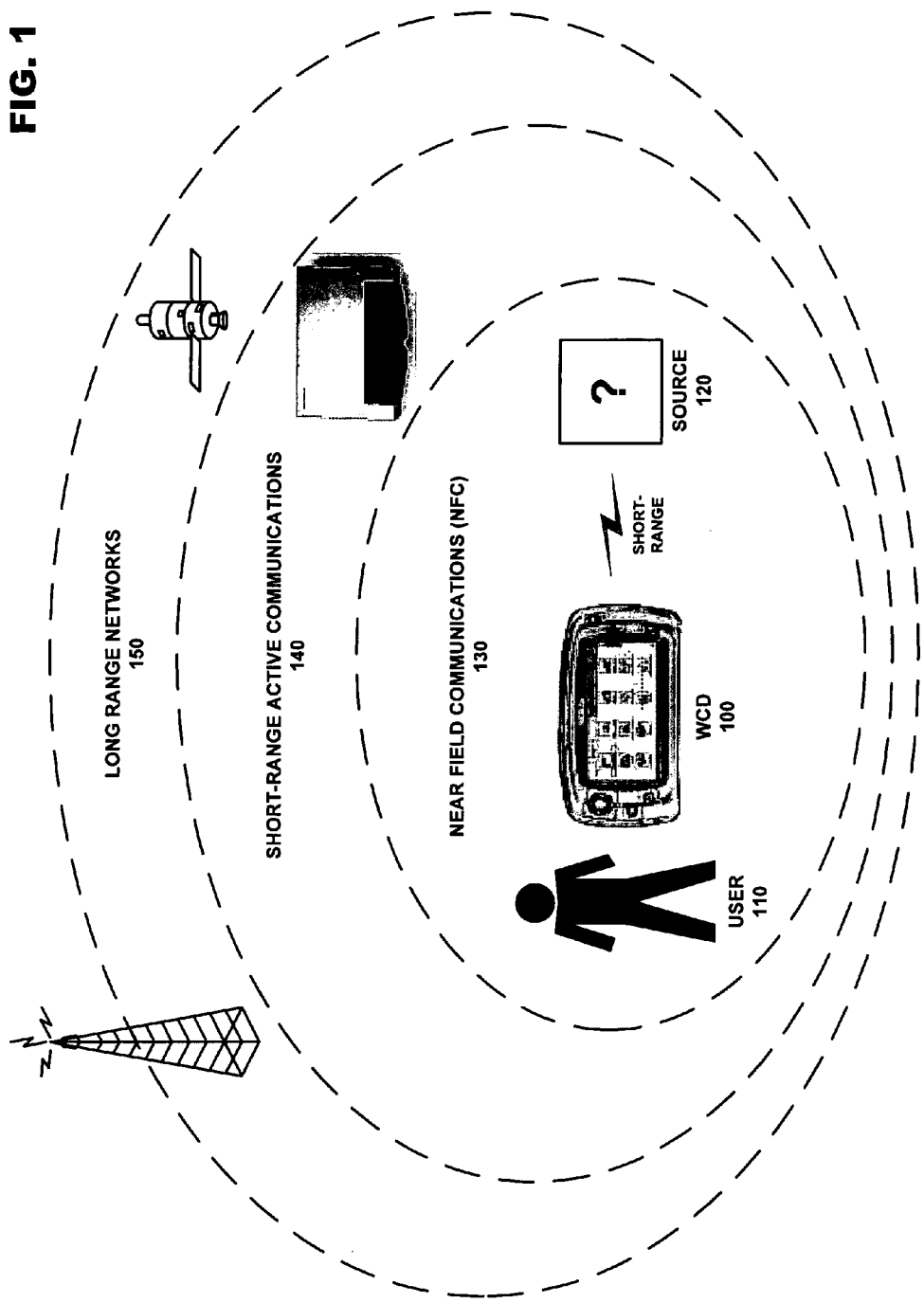
FIG. 1 discloses an exemplary short-range to long-range wireless communication environment usable to describe at least one embodiment of the present invention.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communications (NFC) 130 include various transponder-type interactions wherein normally only the scanning device requires its own power source. WCD 100 scans source 120 via short-range communications. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from 96 bits to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communications. Short-range active communications 140 includes applications wherein the sending and receiving devices are both active. An exemplary situation would include user 110 coming within effective transmission range of a Bluetooth™, WLAN, UWB, WUSB, etc. access point. In the case of Bluetooth Low End Extension (BTLEE)/BluLite, a network may automatically be established to transmit information to WCD 100 possessed by user 110. BTLEE/BluLite may be used for battery-powered devices, such as wireless sensors, since its power consumption is low. A BTLEE device may use the advertisement mode to more rapidly establish the initial connection to WCD 100. This data may include information of an informative, educational or entertaining nature. The amount of information to be conveyed is unlimited, except that it must all be transferred in the time when user 110 is within effective transmission range of the access point. This duration may be extremely limited if the user is, for example, strolling through a shopping mall or walking down a street. Due to the higher complexity of these wireless networks, additional time is also required to establish the initial connection to WCD 100, which may be increased if many devices are queued for service in the area proximate to the access point. The effective transmission range of these networks depends on the technology, and may be from some 30 ft. to over 300 ft. with additional power boosting.

Long-range networks 150 are used to provide virtually uninterrupted communication coverage for WCD 100. Land-based radio stations or satellites are used to relay various communications transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
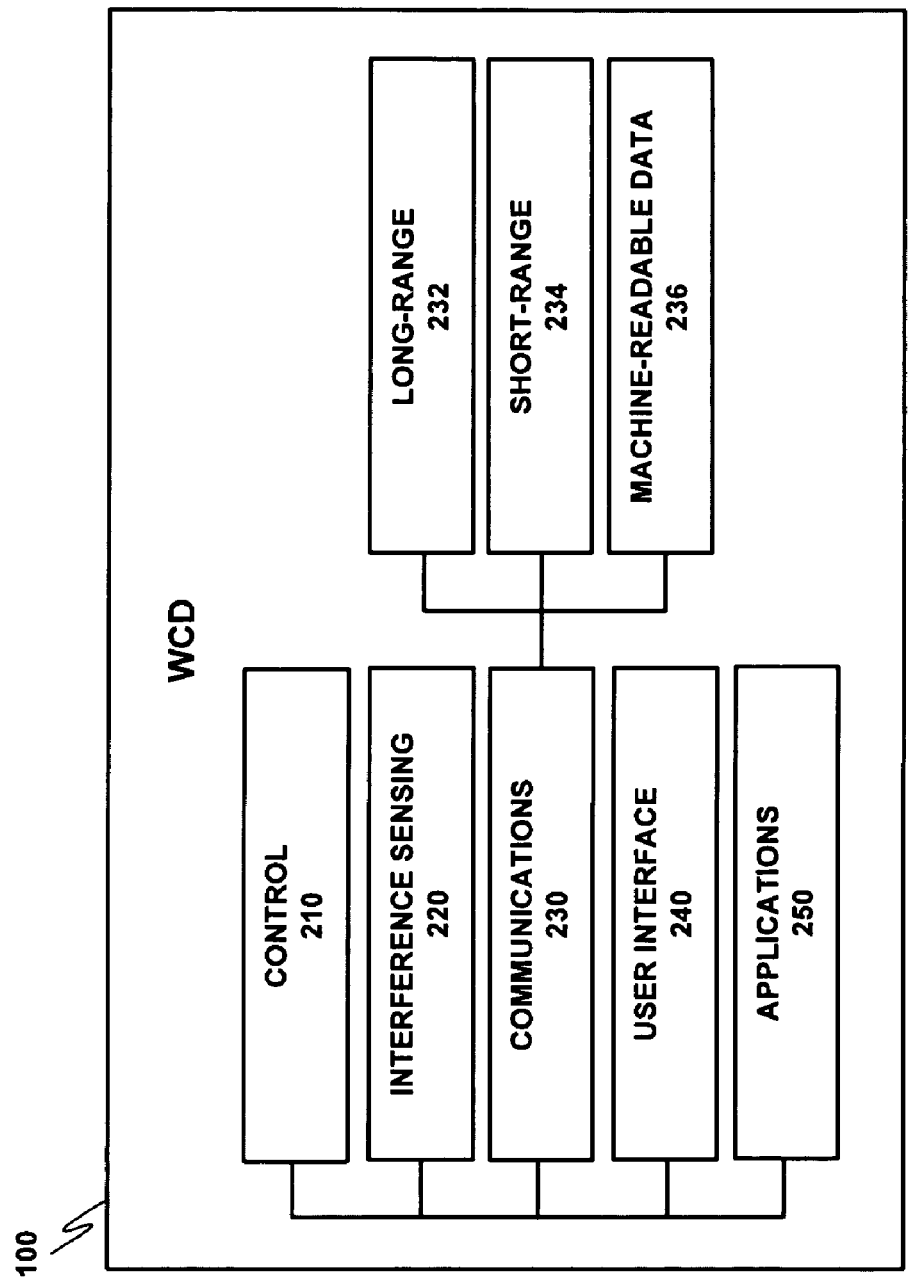
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communications aspects of WCD 100. As shown in FIG. 2, communications module 230 may include, for example, long-range communications module 232, short-range communications module 234 and machine-readable data module 236 (e.g., for NFC). Communications module 230 utilizes at least these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
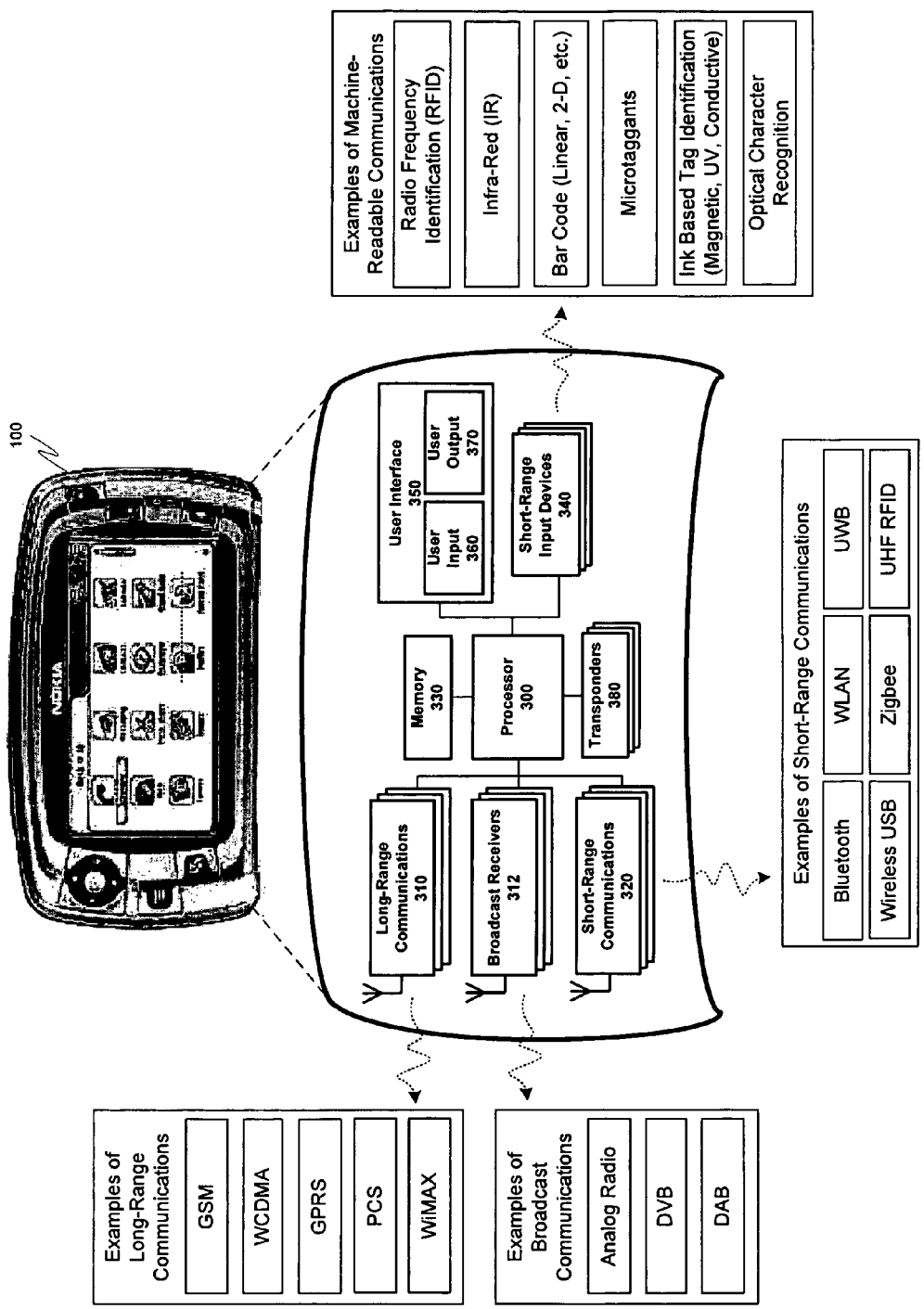
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to at least communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1G to 3G. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300, transmission receiver 312 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

Short-range input device 340, also depicted in FIG. 3, may provide functionality related to the short-range scanning of machine-readable data (e.g., for NFC). For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (including processes related to interpreting UPC labels), and optical character recognition devices for reading magnetic, UV, conductive or other types of coded data that may be provided in a tag using suitable ink. In order for the short-range input device 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, an RFID scanner mounted in a entryway may continuously emit radio frequency waves. When a person with a device containing transponder 380 walks through the door, the transponder is energized and may respond with information identifying the device, the person, etc. Alternatively, a scanner may be mounted in the WCD so that it can read information from other transponders in the vicinity.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces (which may be wired or wireless bus interfaces). Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Medium (WAP), Hypertext Markup Language (HTML) variants like Compact HTML (CHTML), etc.

III. Current Systems for Providing Location-Finding or Directional Information

Figure 4:
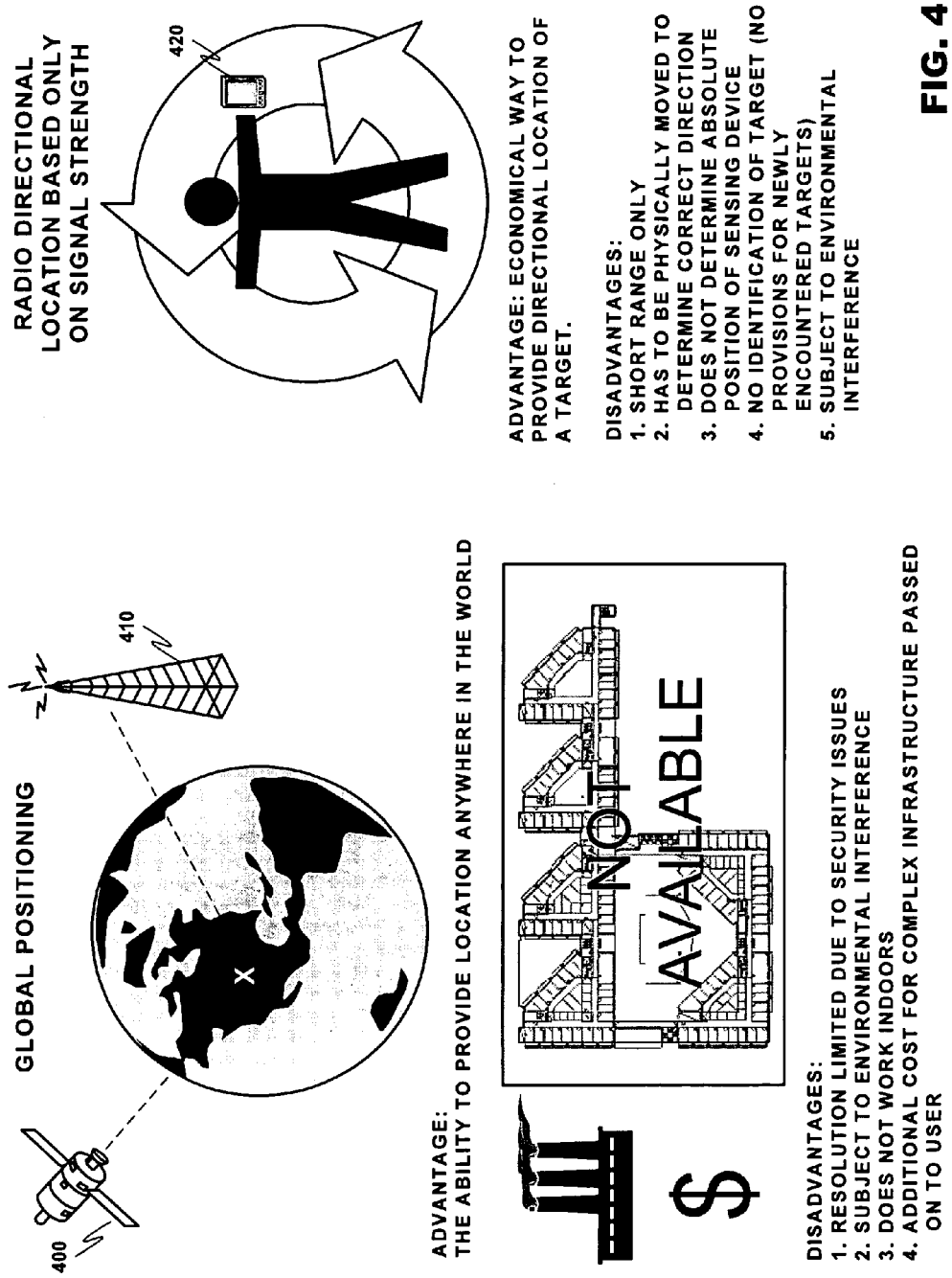
FIG. 4 discloses exemplary forms of location-finding and directional systems currently employed to determine direction and/or location.

There are some examples of location-finding or direction-finding systems on the market today. In FIG. 4, two varieties are disclosed which may represent two extremes in this technology area. These two technologies have been implemented to serve very different purposes, and as such, have different strengths and weaknesses.

Global positioning systems may deliver a precise geographic location (e.g., latitude and longitude measurement) to a user. Traditionally, these systems have been mounted in vehicles, but now smaller compact versions are available that may be carried by a pedestrian. These systems use satellites 400 or terrestrial radio networks 410 to determine the location of a receiver in global coordinates, such as longitude and latitude. The obvious advantage of these systems is their ability to determine the absolute location of a GPS device. Most commercial devices may figure the correct position of a person within a few meters.

However, while these systems deliver global location information, there are some limitations to this technology. GPS is only usable outside due to the need to receive a signal from satellite 400. Network assisted GPS (AGPS) systems also have limited indoor coverage, but the performance is typically not adequate. Precision can be intentionally limited by government regulation due to security concerns regarding how a location device may be maliciously used if too accurate. GPS positioning signals are also subject to multipath (reflection) or environmental interference, especially in dense urban environments, which tends to cause location determining errors. In order to correct this problem, differential systems may be employed combining both satellite 400 and ground based systems 410, however, these systems are more costly to operate, the additional cost of which may be passed on to the consumers. Further, the software required to implement GPS directional systems may be complex, requiring substantial hardware support in order to function properly.

On the other end of the spectrum is single antenna radio location based only on signal strength. Tracking device 420 may be tuned to the frequency of one or more known signal emitters. In the simplest implementation an omnidirectional antenna is used to find any targets in the vicinity by receiving their signals, in order to indicate their presence and possibly the location of the tracking device. To improve the accuracy, a unidirectional antenna on tracking device 420 may be used to measure the strength of each received signal, wherein the reception strength is indicated using a visual or audio method. The user physically moves the device in a sweeping pattern and monitors the signal strength indicator. The direction of strongest signal reception is deemed to be the direction towards the target. RadarGolf™ is an example of this type of device. Also more sophisticated direction and distance tracking devices exist, such as Bluespan's® Ion-Kids®, which are based on proprietary technology.

While this type of system is very economical to operate, it only has limited applications. Tracking device 420 may locate only known objects over relatively short range. The user of the device must physically sweep the device back and forth in order to determine the target direction. There is no way to determine the absolute position of the target or tracking device 420 (e.g., there is no way to estimate longitude and latitude of either tracker or target). In addition, depending on the technology, tracking device 420 is subject to electromagnetic and environmental interference, and would not be effective where this type of interference abounds, for example, in a building.

IV. A Multiple Antenna Direction of Arrival (DoA) Tracking System

At least one embodiment of the present invention employs signals received on multiple antennas in a Direction of Arrival ("DoA") signal processing scheme in order to determine a relative direction to a target from WCD 100. In this technique, the direction of arrival of the incident signal (e.g., the position-indicating transmission) is resolved based on the phase and possibly amplitude differences of signals received by the elements of an antenna array. In the simplest method, historically known as the Bartlett Beamformer, the normalized received power in each array look direction ($\theta$) is calculated using the following relationship:

$$P(\theta) = \frac{a^H(\theta) R a(\theta)}{L^2} \quad (1)$$

Wherein in equation (1), $a(\theta)$ is a so called steering vector of the array and R is the spatial covariance matrix of the received signal. L is the number of elements in the antenna array. $a^H$ denotes a conjugate transpose of the matrix a. The direction giving the highest power is then assumed to be the direction of the target.

The covariance matrix R is obtained as:

$$R = E\{x(t) x^H(t)\} \quad (2)$$

where x(t) is the vector of signals received from the antenna elements as a function of time t.

The elements of the steering vector $a(\theta)$ are the output signals of the array elements, when it receives a plane wave from direction $\theta$. It is defined as:

$$a_n(\theta) = g_n(\theta) \cdot e^{-jk r_n \cdot u_r(\theta)} \quad (3)$$

in which $g_n(\theta)$ is the complex radiation pattern of element n, k is the wave number (defined as $2\pi/\lambda$ where $\lambda$ is the wavelength at center frequency), $r_n$ is the location vector of element n, and $u_r$ is the radial vector towards the incident wave direction $\theta$. In a simple case of a linear array of identical and equally spaced elements the steering vector simplifies to:

$$a(\theta) = g(\theta)[1 e^{-jkd \cos \theta} \ldots e^{-j(L-1)kd \cos \theta}]^T \quad (4)$$

in which d is the inter-element spacing of linear, equally spaced antenna elements in the array. $\theta$ is the angle between the line connecting the linearly located antenna elements and the incident wave direction.

In a small handheld device the radiation patterns of the elements are typically not identical because they are affected by the metallic chassis of the device. The elements may also be differently oriented due to space limitations in the device. In this case, either Eq. (3) must be used, or the steering vector can also be directly measured in a calibration measurement, or it can be computed using electromagnetic simulation tools.

The DoA estimation accuracy decreases in the presence of multipath propagation or noise. In the noisy multipath radio propagation channel the accuracy can be increased by improving the resolution of the array through increasing its size by adding more antenna elements. In addition, the distance between any two antenna elements in the array should not exceed half a wavelength to obtain unambiguous DoA estimate.

Multipath radio propagation causes fading that can lead to rapid changes of the DoA estimates and temporary mispointings. To overcome the problem one aspect of the invention uses a tracking algorithm. It is based on keeping a register of several DoA estimates and choosing the one with highest average power to be selected as the actual output.

The DoA estimation algorithm calculates an Azimuth Power Spectrum (APS), e.g., the signal power received from azimuth directions. The tracking algorithm extracts the maxima from the azimuth power spectrum. It keeps track of e.g. the 5 strongest directions. If one of the newly extracted maxima is close (e.g. within 10 degrees) to one of these directions, then the signal power and the direction is added to the tracked direction. If not, the new direction is tracked. All the signal power values of the tracked directions are filtered using a forgetting curve and the DoA of each tracked direction is calculated using a weighted average of the extracted directions for this tracker. After each tracker update, tracked directions that are closer than e.g. 10 degrees are merged and the number of tracked directions is reduced to the five strongest directions. Without using this tracking algorithm, the strongest maximum would be chosen to be the DoA, which might lead to rapid changes in the estimated DoA due to fading.

Figure 5:
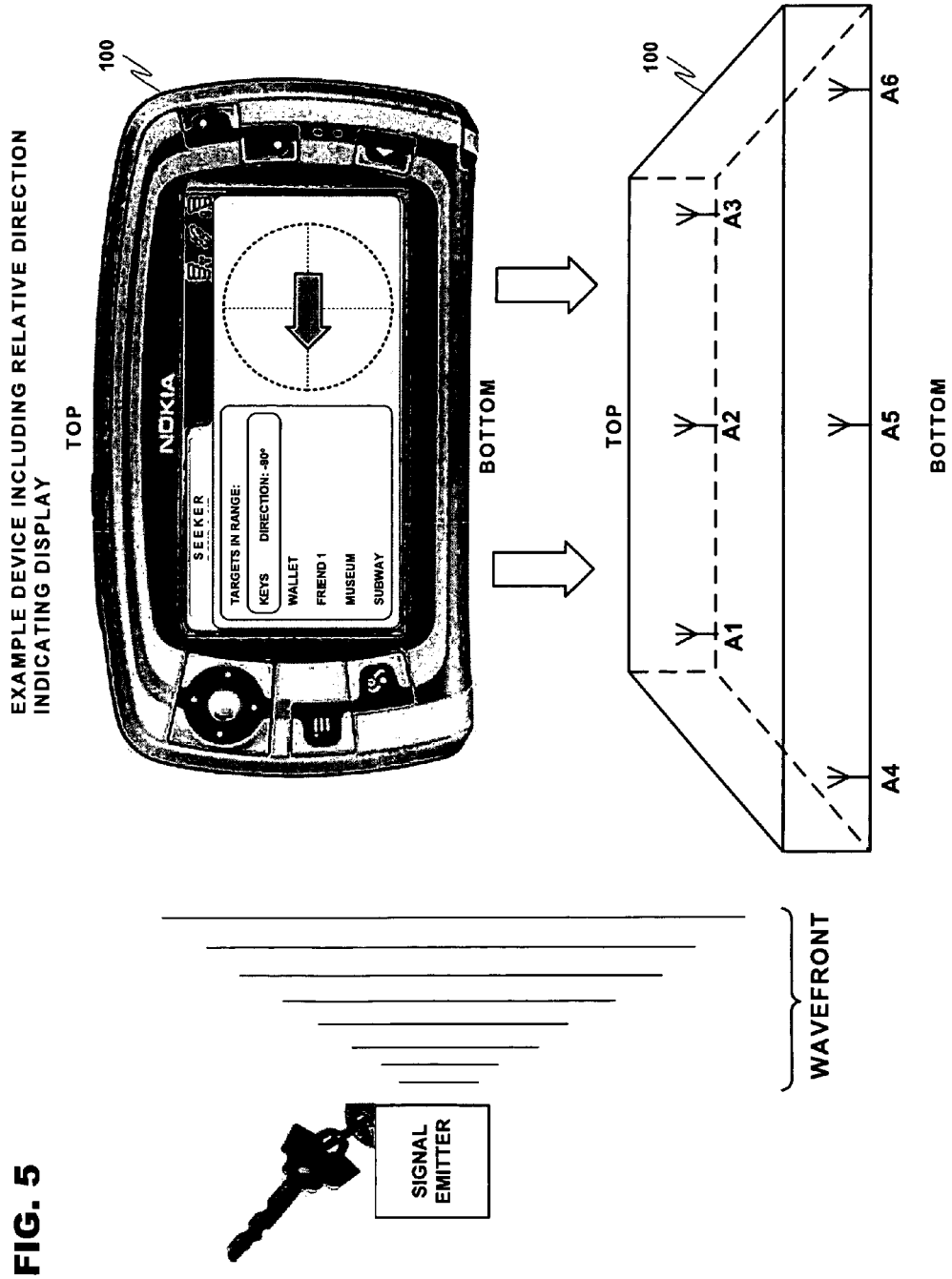
FIG. 5 discloses an exemplary wireless communication device including integrated direction-finding features in the form of an antenna array in accordance with at least one embodiment of the present invention.

FIG. 5 discloses an exemplary WCD 100 configuration usable with the present invention. In addition to the elements and features already disclosed in FIGS. 2 and 3, the present invention may also include an antenna array. A simplified three-dimensional transparent view of WCD 100 is shown below the exemplary exterior picture of the device 100. The transparent three-dimensional view includes at least antennas A1-A6. The number of antennas doesn't have to be six, but it can be any number larger than one. The placement of antennas A1-A6 may be within the outer housing of WCD 100 to form an array such as the one shown. The array may provide directional field sensing that is interpreted into a direction for display on WCD 100. Signal emitter 500 may emit a position-indicating transmission that is receivable via the antenna array. The placement and orientation of these antennas may allow a user to hold WCD 100 in an horizontal orientation, wherein the display faces upward towards the sky. As will be seen, this orientation lends more naturally to a pointer display indicating direction, such as in the use of a traditional compass when orienteering.

In another example (not shown) the antenna array and/or support circuitry may be housed within an outside component that may be removably attached to WCD 100. This exterior component or attachment may be connected when user 110 wants to determine direction or location, and its connection may automatically signal WCD 100 to enter a position or direction finding mode. It is important to note that if the antenna array is housed in an attachable exterior unit, that the orientation of the exterior unit with respect to WCD 100 would be a fixed, predetermined orientation with respect to the housing of WCD 100 in order to establish a known orientation for the antenna array. In this way, the antenna array will always be in the same (or a known) configuration when attached to WCD 100.

FIG. 5 also includes an example display shown on WCD 100 that is viewable by user 110. This display may be implemented in different configurations depending upon the application to which it is applied. In this example, the display shows both a list of possible target objects and an arrow pointer. There can be one or multiple active signal emitters 500 within one area at the same time. Multiple beacons can share the same communications medium by using a multiple access method (code, frequency or time). The "KEYS" target object is currently selected. This object is also represented in FIG. 5 as by signal emitter 500, which may be included as a keychain connected to a set of keys. Since the keys object is selected, the WCD 100 will attempt to define the relative direction towards the target designated as keys. The display shows the directional arrow pointing in the direction of the keys, and gives a relative direction measurement towards the keys of −90°. As the user moves toward the selected target, WCD 100 will continuously measure the signal of the target device and will update the display accordingly so that the arrow and the directional measurement continue to indicate the relative direction toward the keys.

Figure 6:
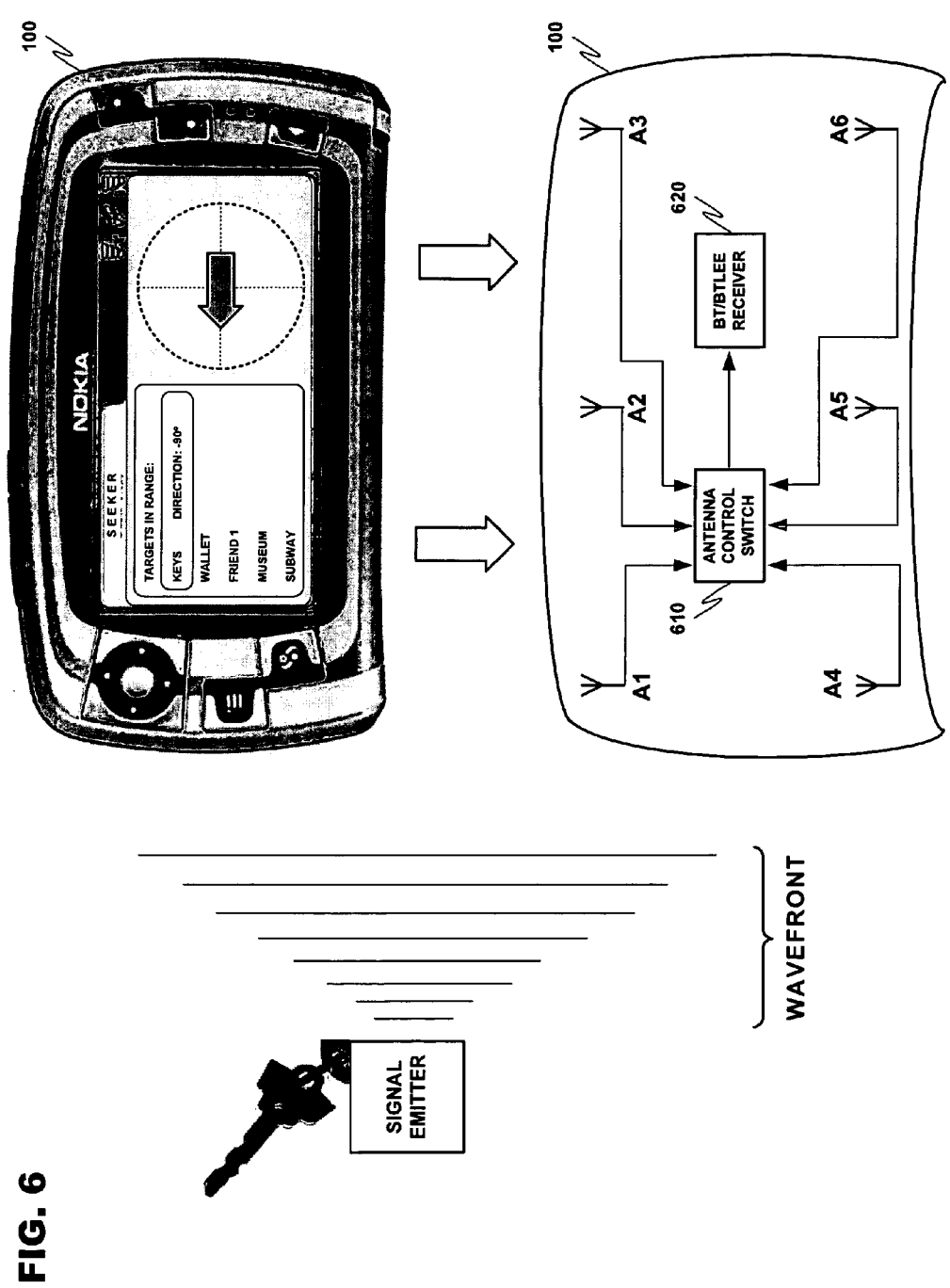
FIG. 6 discloses an exemplary structural description for direction-finding features usable for receiving a position-indicating transmission in accordance with at least one embodiment of the present invention.

FIG. 6 includes a structural diagram of WCD 100. Again, WCD 100 includes any and or all of the elements and features previously disclosed in FIGS. 2 and 3. In FIG. 6, additional elements and features are included that may be composed of stand-alone devices, or may be emulated by combinations of hardware and software present in WCD 100. Antennas A1-A6 may be coupled to antenna control switch 610. Control switch 610 multiplexes the antennas so that one receiver 620 may monitor incoming transmissions from all of the antennas. Signals received on antennas A1-A6 determine the relative direction to a target from WCD 100. The direction of arrival of the incident signal (e.g., the position-indicating transmission) is resolved based on the phase and possibly amplitude differences of the signals received by the respective antennas A1-A6. Control switch 610 sequentially feeds the signal from each antenna to the receiver 620, where the Direction of Arrival ("DoA") signal processing operates on the signal phase and possibly amplitude information to determine a relative direction to a target from WCD 100. This information is fed to receiver 620. Depending on the technology used in the switch, for example GaAs FETs vs. PIN diodes, the switch may operate at different speeds. In view of present technology, it appears that a 10 μs scan time for all antennas is conceivable. Fast switching time is beneficial because it allows DoA estimation from short transmissions and does not set high requirements for the stationarity of the radio channel.

In at least one embodiment of the present invention, receiver 620 is a Bluetooth™ or Bluetooth Low End Extension (BTLEE) receiver, also known as BluLite. BTLEE is an add-on extension to the Bluetooth™ command set composed especially for simple devices. This specialized command set allows low end devices to communicate wirelessly with a significantly lower power requirement. BTLEE may be implemented in chip form to make Bluetooth™ implementation in low end devices more economical. The use of BTLEE may be more appropriate for the location of personal items. A BTLEE chipset may be incorporated into a keychain or into the lining of a wallet or garment to allow locating via wireless communication, as will be explained below. BT/BTLEE receiver 620 receives signals multiplexed from Antennas A1-A6 and uses this information to determine relative direction using DoA signal processing as previously described. The receiver may also, in some cases, receive information contained within the position-indicating transmission. In these cases the determination of direction and the reception of information carried within the signal may be delayed as the primary receiver 620 attempts to multitask both information reception and DoA determination. This situation may be cured by the further example disclosed in FIG. 7.

The example structural configuration of FIG. 7 separates the responsibility of determining DoA determination and BTLEE reception into two separate receiving modules. Antenna A1 is directly tied to BTLEE receiver 720 so that information may be received real-time from the position-indication transmission for immediate decoding. As will be discussed later, this information may include identification information announcing that the device is a possible target, identification of the target and other target related data. Dedicated DoA receiver 730 may then be free to concentrate on deriving the time and spacing relationship between the reception of the position-indicating transmission at the various antennas in the antenna array, which is used to determine the relative direction of the object from WCD 100. The information received by both devices may be synchronized, for example, by control and DoA timing information sent from BTLEE receiver 720 to DoA receiver 703. Further, both receiving devices may then forward information to central processor 300 which may combine, process, and format the information for display on WCD 100. Although FIG. 7 shows two receivers 720 and 730, alternate embodiments of the invention may have more than two receivers. In other examples of the present invention, receivers may also share some components, such as a VCO or synthesizer.

FIG. 7 also discloses two exemplary antenna configurations usable in at least one embodiment of the present invention. The antenna configurations 700 and 710 may be implemented to improve signal reception and directional indication in the device. The more appropriate antenna configuration will depend on a variety of factors including the size of the device, the composition (e.g., materials, layout, complexity, etc.) of the device, the antenna radiation characteristics required for each antenna, antenna spacing, etc.

V. The Directional Signal

FIG. 8 discloses the makeup of an exemplary position-indicating transmission and different types of position indicating signals. Signal description 800 includes an example frame from a BTLEE/BluLite transmission. While BTLEE/BluLite is used for this example, any of the aforementioned communication mediums may also be applicable. Initially, the transmission must be identified as a position-indicating transmission. The 16 bit preamble may include a code (e.g., 1010101010101010) that is used to indicate the beginning of the packet and to synchronize the receiver. This indication allows WCD 100 to begin measurement so that when the 8 bit service field is transmission, one or both of the preamble and the service field may be measured by antennas A1-A6 in WCD 100. The transmission 800 may also include identification information for the position-indicating transmission device, or other device target related information as will be described below.

In addition, different types of position-indicating transmission strategies as disclosed in FIG. 8. Remotely activated location transmission 802 may be employed by a target whose signal emitter 500 may be limited by low power concerns. These devices, such as battery-operated transmitters in a keychain, in a wallet, embedded in an ID badge, mounted in a vehicle such as an automobile, motorcycle, scooter, bicycle or in a piece of clothing, may be activated remotely by a user as needed. For example, the device may operate in a lower power or power conservation mode until a message is received instructing a device to activate the position-indicating transmission signal. This message may be received by any of the aforementioned wireless mediums such as via a Bluetooth™ message. Alternatively, signal emitter 500 may include a transponder, activated by a scanning signal from WCD 100. This scanning signal may be, for example, a UHF RFID signal. This signal may activate a transponder in a 5-10 meter range, and the transponder may respond with a signal that can be used to determine the object's relative position, or may in turn trigger another subsystem in signal emitter 500 to transmit the position-indicating transmission.

In 804, the relative direction towards devices that require a request to activate may be determined. These are typically powered devices that are in the possession of another user. For example, User 110 may want to locate a friend that user 110 believes to be in the immediate area. User 110 may send a message to the friend's WCD requesting an activation of a position-indicating transmission. This message may occur via any of the long-range mediums (for example, via SMS) or any of the short-range mediums previously discussed. Depending on whether the friend is familiar with user 110, or for other security-related reasons, the friend may accept or deny the request to activate the position-indicating feature in their WCD. If the friend declines, a message is returned to WCD 100 that indicates the friend has refused the locating request. Alternatively, the friend may accept the request, activate their location beacon and WCD 100 may receive the position-indicating transmission. This feature may be utilized for commercial features as well. WCD 100 may indicate that there is a taxi cab in the immediate area. User 110 may send a message to the taxi requesting to hire the cab and position indication. If the taxi is already hired or on a break, the driver may refuse the request, or ignore it. On the other hand, if the driver is looking for a fare he may accept the request, the relative position of the taxi being displayed in WCD 100 with other relevant information such as fare information.

A third type of target includes an always active position-indicating transmission 806. These signal emitters may be expanded range externally powered devices, for example, Bluetooth™ access points. WCD 100 may display these position markers so that user 110 may locate desired services. For example, a police car may include an always active position-indicator so that pedestrians may find them in times of emergency. This same example may also apply to Hospital emergency rooms. In non-emergency situations, these always-on devices 806 may indicate wireless access points wherein a user may connect to the Internet via a short-range wireless connection. Landmarks, commuter transportation such as buses and trains, retail establishments (restaurants and stores) and entertainment venues may also utilize always-on position-indicating transmission emitters to advertise their services.

VI. Sensor Integration

Figure 9A:
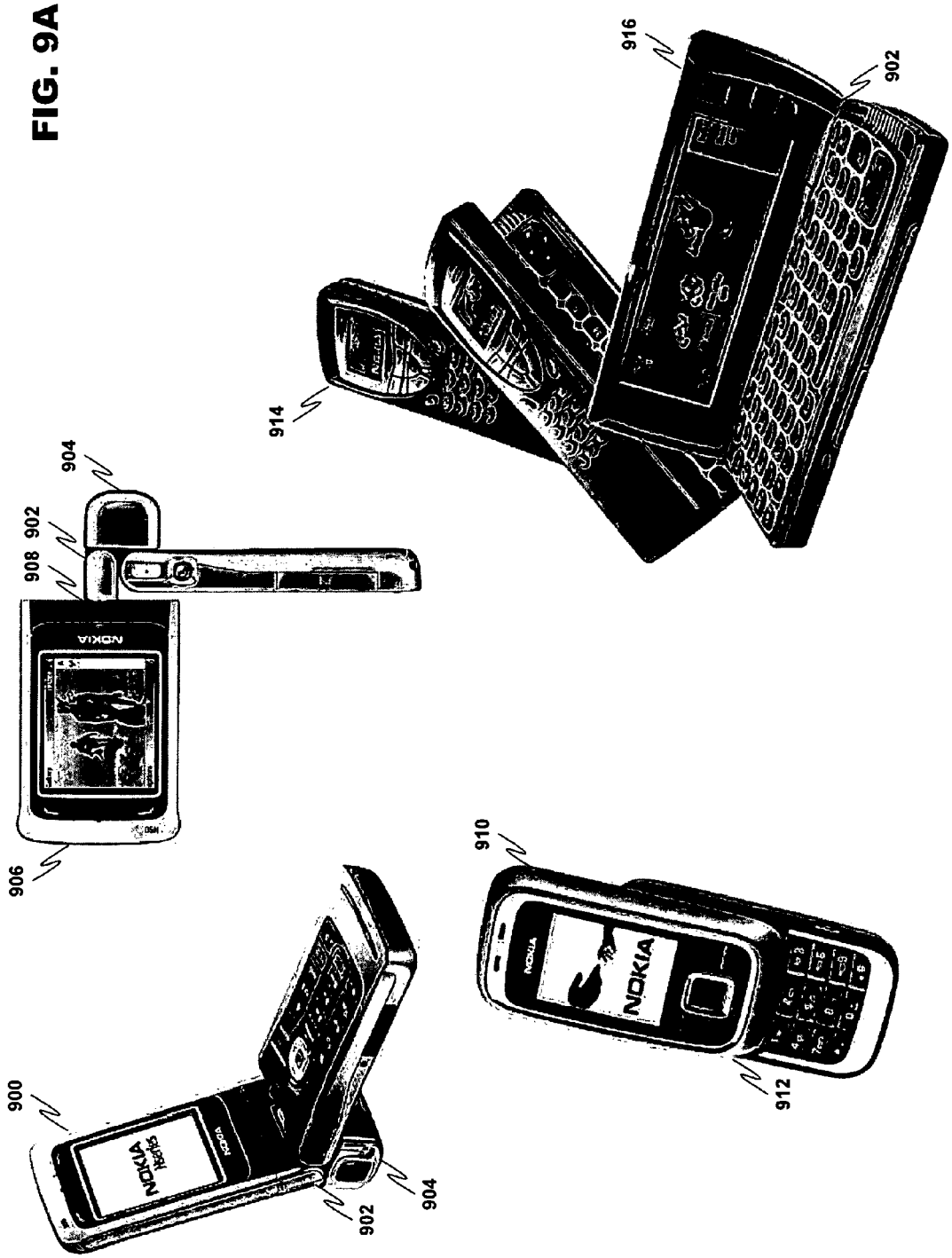
FIG. 9A discloses exemplary mechanical orientations of wireless communication devices in accordance with at least one embodiment of the present invention.

FIG. 9A discloses a plurality of exemplary WCDs 100 in various mechanical orientations. In each of these examples, mechanical sensors may provide information on the relative orientation of two sections of WCD 100. In at least one case, an exemplary WCD 100 is pictured at 900, wherein a sensor may be integrated into hinge 902. This sensor may provide information to a controller in WCD 100 regarding the orientation of the device, such as shown at 900, as to whether a flip cover of the device is open or closed. Further, camera 904 is also disclosed at 900. The controller of the device may make a determination, based on sensor data (collected, for example, from sensor 902) as to whether to activate camera 904. The same device is shown in another mechanical orientation at 906. A sensor 908 located in a twist joint of WCD 100 may also relay information to the controller of the device in order to activate certain features or modes. In this example, the information provided by sensors 902 and 908, alone or in combination, may trigger the controller of the WCD shown at 906 to activate camera 904. The image information received by camera 904 may then be displayed on a display screen of the WCD 100. In addition, other applications and/or resources related to camera 904 may be triggered by evaluating the information collected from sensors 902 and/or 908.

Further examples of different devices including integrated sensors are shown at 910 and 916 in FIG. 9A. The WCD 100 shown at 910 is divided into at least two sections that slide laterally with respect to one another. The device may function in one mode when the two sliding sections are aligned. However, a sensor in the sliding mechanism 912 may detect when the device is opened (e.g., when the two sections are moved so that they are no longer aligned). In this second orientation, the controller of the device may implement alternate functionality or enable resources not available in the "closed" mode. In the example at 916, a cellular telephone mode may be implemented at 914 when a hinge sensor 902 (similar to sensor 902 previously discussed with respect to 900) provides that the device is in a closed orientation. However, when the device is changed to an open orientation (as shown at 916), an internal screen may be activated along with other resources which enable additional functionality in the device.

Figure 9B:
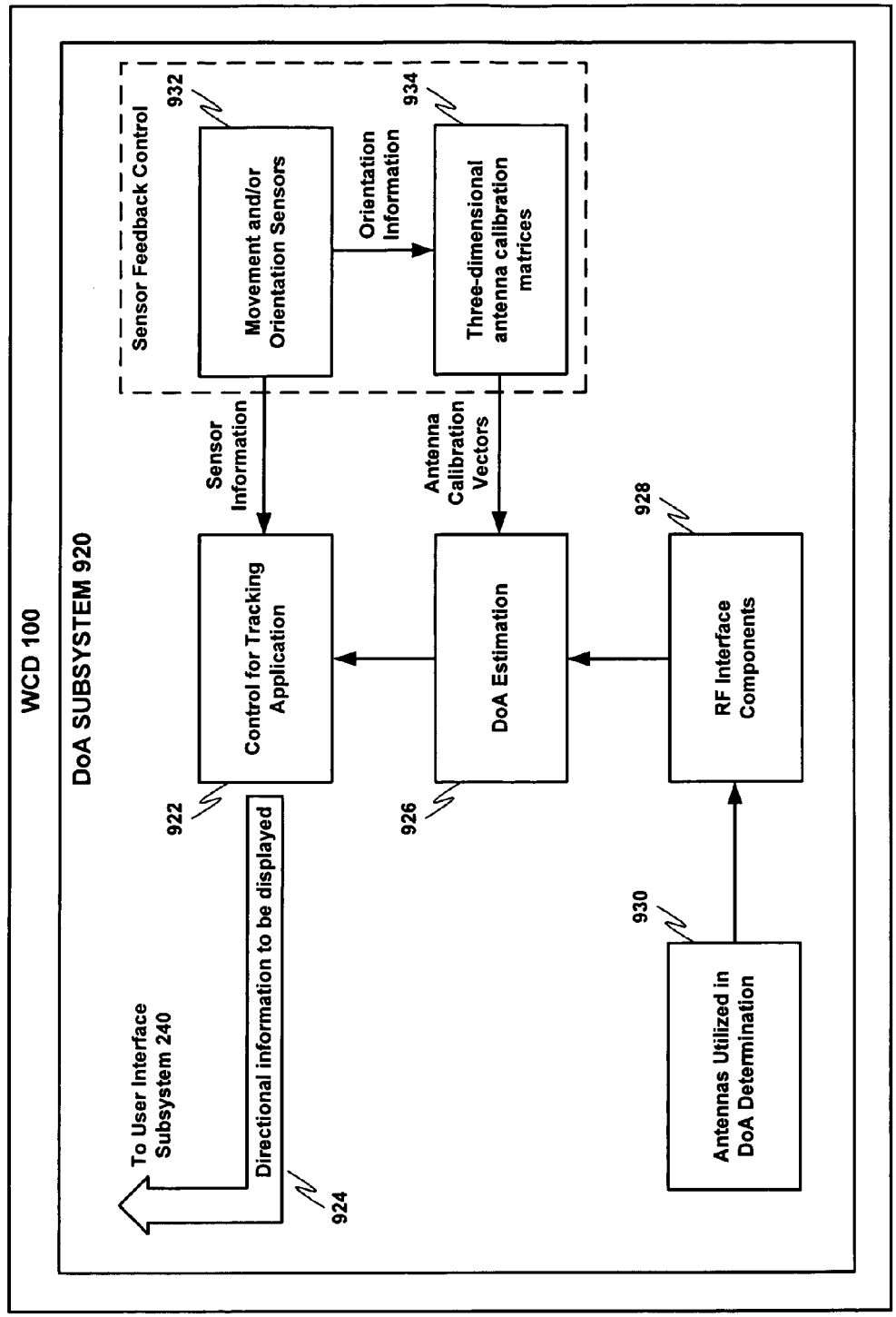
FIG. 9B discloses a system representation of an exemplary direction of arrival estimating subsystem in accordance with at least one embodiment of the present invention.

FIG. 9B discloses a functional diagram of a DoA subsystem in accordance with at least one embodiment of the present invention. WCD 100 may include, along with the systems and/or modules already discussed, a DoA subsystem 920. Control for a tracking application 922 may, for example, consist of an application in memory 330 executing on the main processor 300 of WCD 100, or may include a controller local to the subsystem 920 working alone, or in conjunction with, processor 300. The local controller may utilize information provided by a DoA estimation module 926 to display direction information 924 for a user. This information may be displayed through user interface module 240 as previously described. The DoA estimation module 926 utilizes RF interface components 928 to receive information received via antenna array 930. These modules making up DoA subsystem 920 may work together in order to provide a relative direction towards a target beacon. However, in the present invention, additional modules may also be included to further enhance the performance of WCD 100 while performing a DoA estimation.

The sensor feedback control section of DoA subsystem 920 includes at least two additional modules that may coupled or integrated into the system. Movement and/or orientation sensors module 932 may collect information from sensors integrated into WCD 100 (e.g., the sensors described in FIG. 9A), and may convey this information to at least the control for the tracking application 922 and/or a three-dimensional (3-D) antenna calibration matrices module 934. Controller 922 may use this sensor information to configure and/or implement functionality to enhance the performance of WCD 100 as will be further described below. 3-D antenna module 934 may use the collected sensor information to determine the appropriate antenna calibration vectors to provide to DoA Estimation module 926. These calibration vectors allow DoA Estimation module 926 to configure the antenna array. The antenna configuration may include, for example, from which antennas to measure received beacon signals, and how the measurements from the active antennas will be interpreted in order to determine direction.

FIG. 10 discloses two examples of applications wherein different antenna calibration vectors may be employed. In the first example application 1000, WCD 100 may be configured in a mode allowing a user to seek a target including a locating beacon. The orientation of WCD 100 in a "flip-phone open" mode may trigger 3-D antenna module 934 to set a specific antenna configuration, such as an antenna calibration vector utilizing six directional antennas sensing in a spherical-pattern matrix as shown at 1000, for use in DoA estimation. In an alternative scenario, the example disclosed at 1010 shows sections of WCD 100 in another relative orientation. As previously described in FIG. 9A, information received from sensors 902 and/or 908 may trigger the activation of camera 904. In this particular application of DoA estimation, user 110 may desire to track the location of a target so that it may appear on the display of WCD 100. User 110 may be prompted by visual indicia appearing on the display to move WCD 100 so that camera 904 may be pointed towards the beacon of the target. As a result, a subset of the available antennas may be configured by 3-D antenna module 934. This subset may include only sensing in a two-dimensional plane (four sensed directions), which may in turn allow user 110 to position WCD 100 so that the target appears on the display of the device while saving resources not necessary for the DoA determination. An exemplary display for the DoA estimation as described in example 1010 will be disclosed further below in FIG. 13.

VII. Examples of Power Management Modes for Tracking and Beacon Devices

The information provided by sensors integrated within WCD 100 may be utilized in a number of applications. An example of using orientation sensors to provide information used for configuring WCD 100 when executing a DoA application has already been described. In another example, FIG. 11 discloses how information from motion sensors within WCD 100 may be used in a power management scheme. A case where no power management is employed is disclosed in the first example on the top of FIG. 11. In this example, transmission (TX) packets from a beacon 1100 are sent out on a periodic basis. In order to receive these periodic transmissions for use in DoA determination, a tracking application may scan 1110 continuously (as represented by a solid bar with respect to a progressing timeline in FIG. 11). While accurate resolution may be provided with both devices under constant operation, a consequence may also occur in that power is continuously consumed in both devices during the tracking process, which may render the DoA tracking application inefficient and somewhat undesirable for user 110 to employ due to the possible draining effect on the battery life of WCD 100.

The present invention, in at least one embodiment, may employ information provided by various sensors in WCD 100 in order to manage or conserve battery life. In the second example disclosed in FIG. 11, a power management scheme is applied to the tracking device. The target beacon 1100 continues to emit a signal periodically. However, motion sensors integrated in WCD 100 (e.g., in the form of a semiconductor gyroscope chip, micro motion sensor, etc.) may further be used to detect when WCD 100 is being moved. If WCD 100 is motionless, and the target is also not moving, then updated directional information would not be necessary until the position of WCD 100 changes. Therefore, as disclosed in the example, the tracker application halts the DoA estimation when motion sensors determine that WCD 100 is stationary. At a time when motion resumes, the DoA application control 902 may resume the DoA estimation in order to provide updated directional information through a display on WCD 100. In a further example of the present invention, power may be managed both on the tracking device and in the target beacon. A target beacon may be a compact, low-power device operating on batteries, so power conservation may be even more essential in this device. As disclosed in the third example of FIG. 11, power management is applied in the tracking device in a similar manner as described with regard to the second example. However, now messages (TX) may also be transmitted to the target beacon when a change in state is detected in the tracking device. For example, a message 1112 may be sent to alter the beacon packet transmission period or to completely stop the target beacon signal when WCD 100 becomes stationary. Another message 1113 to resume the broadcast of the beacon signal may then be sent when motion is again detected in the tracking device. Further, the devices may also agree on a sleep period for a beacon device so that WCD 100 may reset the sleep counter with TX packet 1114 after every sleep period in the beacon device.

This avoids continuous transmission of the locator signal while a DoA application is in sleep mode. In this manner, the target beacon may be paused when a tracking device is not actively performing a DoA estimation, and as a result, power may be conserved in both devices. Similar messages, while not pictured, may also be sent at the start of tracking and the conclusion of tracking to similarly conserve energy in the target beacon.

Figure 12:
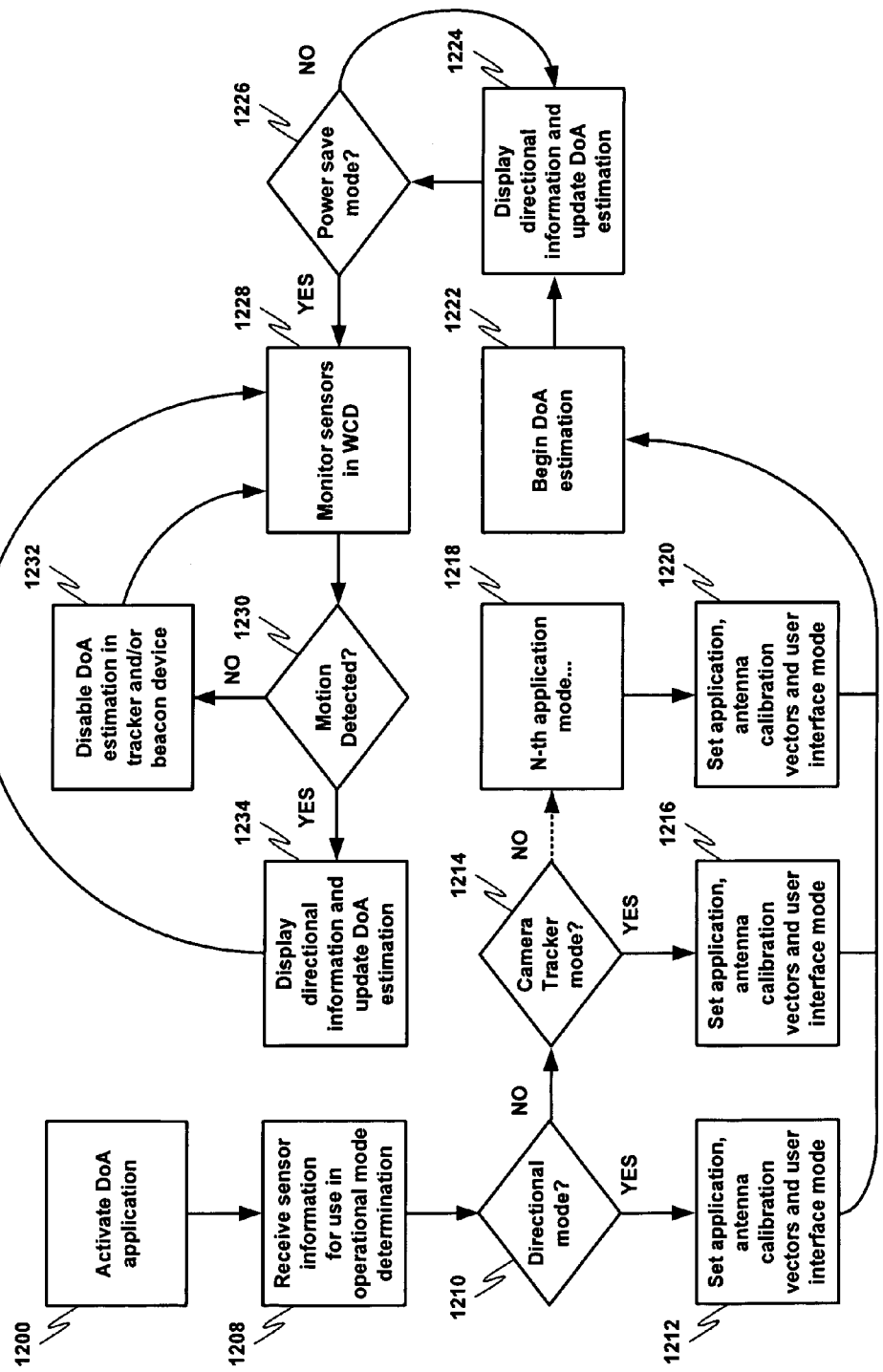
FIG. 12 discloses an exemplary process flowchart for device management using sensor information during the execution of a direction of arrival estimation in accordance with at least one embodiment of the present invention.

An exemplary process flow in accordance with at least one embodiment of the present invention is disclosed in FIG. 12. An application employing DoA estimation is initiated in step 1200. This activation may occur to an intervention by user 110, automatically due to a relative orientation of sections making up WCD 100, etc. Part of the initiation of the DoA application will be to retrieve orientation information from various sensors within WCD 100 in step 1208. This information may be utilized by WCD 100 in order to appropriately configure an operational mode. For example, in step 1210 sensor information is read to determine whether a compass directional mode should be set such as that disclosed in FIG. 10, example 1000. If the sensor information dictates this mode, then in step 1212 the DoA application, antenna calibration vectors and a user interface mode may be set in WCD 100. Alternatively, a camera tracking mode (e.g., example 1010) may be dictated by the output of various sensors in WCD 100 (step 1214). Accordingly, another DoA application, antenna calibration vectors and a user interface mode (e.g., incorporating images captured by camera 904) may be set in step 1216.

As previously set forth, 1210 and 1214 are exemplary modes used for the sake of explanation in the disclosure. There is no limitation as to the number or type of configuration modes that may be set in WCD 100, as indicated by the dotted arrow pointing to N-th application mode in step 1218 and the corresponding configuration information in step 1220. An alternate mode may include, but is not limited to, a mode that senses when the current orientation of WCD 100 interferes with accurate direction determination, and as a result, may compensate for the sensed orientation by enabling, for example, a different antenna calibration vector. A similar correction or compensation mode may be employed when user 110 moves WCD 100 too quickly for an accurate DoA estimation. Increased activity detected by motion sensors in WCD 100 may trigger a configuration that increases the speed of the DoA estimation, possibly at the cost of other characteristics such as direction resolution or power management in the tracking device.

A DoA determination may initiate in step 1222. The beacon signal may be received by one or more antennas in an antenna array within (or attached to) WCD 100, and a DoA estimation may be converted into directional information for display on the device. If a power management mode is invoked in conjunction with a DoA application, as determined in step 1226, sensor information may be collected in step 1228. If no motion is detected in step 1230 (e.g., WCD 100 is currently stationary) then the DoA estimation is temporarily disabled in step 1232. This pause in scanning may occur in conjunction with a message being sent to the beacon device of the target causing it to halt transmission of the locator signal until further notice. If the movement of WCD 100 is detected in step 1230, then in step 1234 the DoA estimation is resumed in conjunction with a message being sent to the target beacon to also resume the broadcast of the locator signal, if necessary.

VIII. Examples of Power Signal Quality Determination

In another aspect of the present invention, an estimated quality of a received signal may be measured and displayed for user 110 in conjunction with directional information. In at least one embodiment of the present invention, this quality information may indicate to user 110 a confidence level as to whether the direction being indicated is the actual direction towards the target, and in some cases, the estimation may be used to determine whether to display any directional indication at all for signals with a quality level below a predetermined threshold.

FIG. 13 includes three Azimuthal Power Spectrum (APS) graphs at 1300. These graphs show measured signal power levels over a 360° radius. In the course of DoA estimation in the present invention, the APS may be continually measured in order to determine a signal received directly from the target beacon over reflected signals due to obstructions, interferences, etc. The measurements may look for peaks (local power maxima) that occur close together and combine these maxima as part of a filtering process. The filtering process seeks to remove reflected signals that may indicate incorrect directions of arrival from stronger signals that indicate the appropriate direction. If, after filtering occurs, a single power peak (or a close grouping of power peaks) from a certain direction of arrival may be identified, then a quality indicator may be incremented. An exemplary quality indicator 1310 (labeled "Q" in the display) shows a confidence level in the received signal. Further, a directional indicator 1312 may indicate a relative direction towards a target so that an image of a target may be captured and aligned with indicia 1314 (also shown on the display). However, in cases where there is no single power peak (e.g., there are multiple peaks that are close in power level), the quality level indicator 1310 may be reduced. If multiple power level peaks have an identical power level or a power level within a predetermined threshold of correspondence, a variety of actions may be triggered in WCD 100. In at least one scenario, a direction indication may be withheld until at least one dominant power peak presents itself. This action may be combined with a message to the user that the signal quality is too low to reliably indicate a direction. As more measurements are taken during a DoA determination, a dominant signal may become evident, and at that point, the DoA estimation and directional indication may be resumed on the display of WCD 100.

Figure 14:
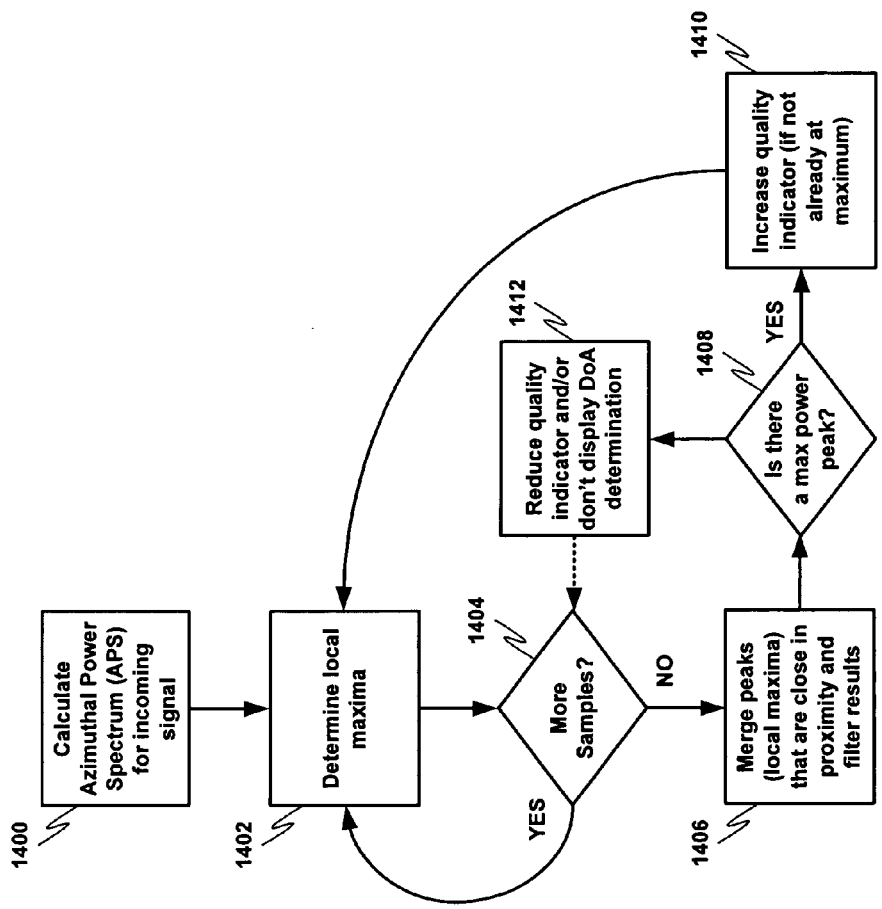
FIG. 14 discloses a process flowchart for executing an exemplary signal quality determination in accordance with at least one embodiment of the present invention.

A process flow for a signal quality determination in accordance with at least one embodiment of the present invention is disclosed in FIG. 14. In step 1400, an Azimuthal Power Spectrum (APS) is calculated based on signal information received by the antenna array integrated within (or coupled to) WCD 100. This information is then processed in step 1402 in order to determine the local maxima. In step 1404 it is determined if more samples are required before filtering may occur in step 1406. If enough data has been collected to make a quality determination in step 1404, then in step 1406 power peaks (local maxima) that are in close proximity are merged, and the data is further filtered in order to determine if a single dominant power peak exists. If in step 1408 a single dominant power peak is evident, then the direction of arrival is determined to be from where the dominant power peak was received, and a quality indicator 1310 may be increased (if not already at maximum) in step 1410. Alternatively, if no dominant power peak is evident, then in step 1412 the quality indicator 1310 may be reduced and/or actions may be taken until a predominant power peak is determined. These actions may include taking additional samples (as indicated by the dotted arrow pointing to step 1404 in FIG. 14), preventing directional information derived from a DoA determination from being displayed until a predominant power peak is found and/or issuing a message to user 110 that the current DoA estimation is unreliable due to the low quality level of the locator signal being received.

The present invention is an improvement over existing systems in that it allows for direction of arrival estimation in a wireless communication device with a reduced chance of depleting the power in the device or misleading a user due to the reception of false signals. In this way, a user may have more confidence in the directional information provided by an application employing direction of arrival estimation, and will not fear using these applications due to a perceived negative impact on the performance of the wireless communication device.

Accordingly, it will be apparent to persons skilled in the relevant art that various changes in form a and detail can be made therein without departing from the spirit and scope of the invention. This the breadth and scope of the present invention should not be limited by any of the above-described exemplary embodiments, but should be defined only in accordance with the following claims and their equivalents.

What is claimed:

1. A method, comprising:
    sensing, using one or more sensors in a device, information related to a mechanical orientation of a device;
    configuring direction of arrival estimation functionality in the device based on the information sensed by the one or more sensors; and
    determining a direction of arrival estimate of a received signal in the device, wherein at least one sensed condition related to the received signal is used to alter a power mode for the direction of arrival estimation functionality.

2. The method of claim 1, wherein the one or more sensors include at least position sensors enabled to indicate the relative orientation of at least one section of the device to another section of the device.

3. The method of claim 1, wherein the one or more sensors include at least motion sensors enabled to determine when the device is being moved.

4. The method of claim 1, wherein a direction of arrival estimate includes determining the direction of arrival of the signal using an array of directional antennas coupled to the device, and further indicating the relative direction towards the source of the signal on a user interface in the device.

5. The method of claim 4, wherein configuring the direction of arrival estimation functionality in the device based on the information sensed by the one or more sensors includes selecting at least a direction of arrival application program, antenna calibration vectors for the antenna array and a display mode for the user interface.

6. The method of claim 1, wherein at least one sensed condition related to the received signal is signal quality.

7. The method of claim 1, wherein at least one sensed condition related to the received signal is a change, or lack of change, in position of the source of the received signal.

8. The method of claim 1, wherein altering the power mode of the direction of arrival estimation functionality includes at least one of putting direction of arrival estimation functionality in the device into a power conservation mode or disabling the direction of arrival estimation functionality.

9. A device, comprising:
    one or more sensors;
    at least one direction of arrival estimation module; and
    a processor coupled to the one or more sensors and the at least one direction of arrival estimation module, the processor being configured to:
        sense, using the one or more sensors, information related to a mechanical orientation of the device;
        configure the at least one direction of arrival estimation module in the device based on the information sensed by the one or more sensors; and
        determine a direction of arrival estimate of a received signal in the device,
        wherein at least one sensed condition related to the received signal is used to alter a power mode for the direction of arrival estimation module.

10. The device of claim 9, wherein the one or more sensors include at least position sensors enabled to indicate the relative orientation of at least one section of the device to another section of the device.

11. The device of claim 9, wherein the one or more sensors include at least motion sensors enabled to determine when the device is being moved.

12. The device of claim 9, wherein a direction of arrival estimate includes determining the direction of arrival of the signal using an array of directional antennas coupled to the device, and further indicating the relative direction towards the source of the signal on a user interface in the device.

13. The device of claim 12, wherein configuring the direction of arrival estimation module in the device based on the information sensed by the one or more sensors includes selecting at least a direction of arrival application program, antenna calibration vectors for the antenna array and a display mode for the user interface.

14. The device of claim 9, wherein at least one sensed condition related to the received signal is signal quality.

15. The device of claim 9, wherein at least one sensed condition related to the received signal is a change, or lack of change, in position of the source of the received signal.

16. The device of claim 9, wherein altering the power mode of the direction of arrival estimation module includes at least one of putting direction of arrival estimation functionality in the device into a power conservation mode or disabling the direction of arrival estimation module.

17. A computer program product comprising computer executable program code recorded on a non-transitory computer readable storage medium, the computer executable program code comprising:
    code configured to cause a device to sense, using one or more sensors, information related to a mechanical orientation of the device;
    code configured to cause the device to configure direction of arrival estimation functionality based on the information sensed by the one or more sensors; and
    code configured to cause the device to determine a direction of arrival estimate of a received signal in the device, wherein at least one sensed condition related to the received signal is used to alter a power mode for the direction of arrival estimation functionality.

18. The computer program product of claim 17, wherein the one or more sensors include at least position sensors enabled to indicate the relative orientation of at least one section of the device to another section of the device.

19. The computer program product of claim 17, wherein the one or more sensors include at least motion sensors enabled to determine when the device is being moved.

20. The computer program product of claim 17, wherein a direction of arrival estimate includes determining the direction of arrival of the signal using an array of directional antennas coupled to the device, and further indicating the relative direction towards the source of the signal on a user interface in the device.

21. The computer program product of claim 20, wherein configuring the direction of arrival estimation functionality in the device based on the information sensed by the one or more sensors includes selecting at least a direction of arrival application program, antenna calibration vectors for the antenna array and a display mode for the user interface.

22. The computer program product of claim 17, wherein at least one sensed condition related to the received signal is signal quality.

23. The computer program product of claim 17, wherein at least one sensed condition related to the received signal is a change, or lack of change, in position of the source of the received signal.

24. The computer program product of claim 17, wherein altering the power mode of the direction of arrival estimation functionality includes at least one of putting direction of arrival estimation functionality in the device into a power conservation mode or disabling the direction of arrival estimation functionality.

25. A method, comprising:
 sensing, using one or more sensors in a device, information related to a state and/or alignment of the device;
  configuring the device based on the information sensed by the one or more sensors;
  determining a direction of arrival estimate of a received signal in the device, wherein sensed conditions relating to the state and/or alignment of the device are utilized to affect the behavior of the device while determining the direction of arrival estimate; and
 if a power management mode is enabled, performing power management that disables the direction of arrival estimate determination when one or more sensors detect that the device is stationary.

26. A device, comprising:
 one or more sensors;
 at least one direction of arrival estimation module; and
 a processor coupled to the one or more sensors and the at least one direction of arrival estimation module, the processor being configured to:
  sense, using one or more sensors, information related to a state and/or alignment of the device;
  configure the device based on the information sensed by the one or more sensors;
  determine a direction of arrival estimate of a received signal in the device, wherein sensed conditions relating to the state and/or alignment of the device are utilized to affect the behavior of the device while determining the direction of arrival estimate; and if a power management mode is enabled, perform power management that disables the direction of arrival estimate determination when one or more sensors detect that the device is stationary.

27. A computer program product comprising computer executable program code recorded on a non-transitory computer readable storage medium, the computer executable program code comprising:
 code configured to cause a device to sense, using one or more sensors, information related to a state and/or alignment of the device;
 code configured to cause a device to configure the device based on the information sensed by the one or more sensors;
 code configured to cause a device to determine a direction of arrival estimate of a received signal in the device, wherein sensed conditions relating to the state and/or alignment of the device are utilized to affect the behavior of the device while determining the direction of arrival estimate; and
 code configured to cause a device to, if a power management mode is enabled, perform power management that disables the direction of arrival estimate determination when one or more sensors detect that the device is stationary.

* * * * *

UNITED STATES PATENT AND TRADEMARK OFFICE
CERTIFICATE OF CORRECTION

PATENT NO. : 7,978,137 B2  
APPLICATION NO. : 12/029290  
DATED : July 12, 2011  
INVENTOR(S) : Kalliola et al.

Page 1 of 1

It is certified that error appears in the above-identified patent and that said Letters Patent is hereby corrected as shown below:

On the Cover Page

Item (75), line 3, "Jantunen, Finnish" should be --Jantunen, Helsinki--

Signed and Sealed this

Twentieth Day of December, 2011

David J. Kappos  
*Director of the United States Patent and Trademark Office*